Dec. 10, 1963 J. R. HECK 3,114,120

RADIO FREQUENCY VOLTAGE BALANCING DEVICE

Filed July 9, 1959

WITNESSES

Edwin E. Bassler

James F. Young

INVENTOR

James R. Heck

BY

ATTORNEY

United States Patent Office 3,114,120
Patented Dec. 10, 1963

3,114,120

RADIO FREQUENCY VOLTAGE BALANCING DEVICE

James R. Heck, Catonsville, Md., assignor to Westinghouse Electric Corporation, East Pittsburgh, Pa., a corporation of Pennsylvania Filed July 9, 1959, Ser. No. 826,035
7 Claims. (Cl. 333—25)

Figure 1:
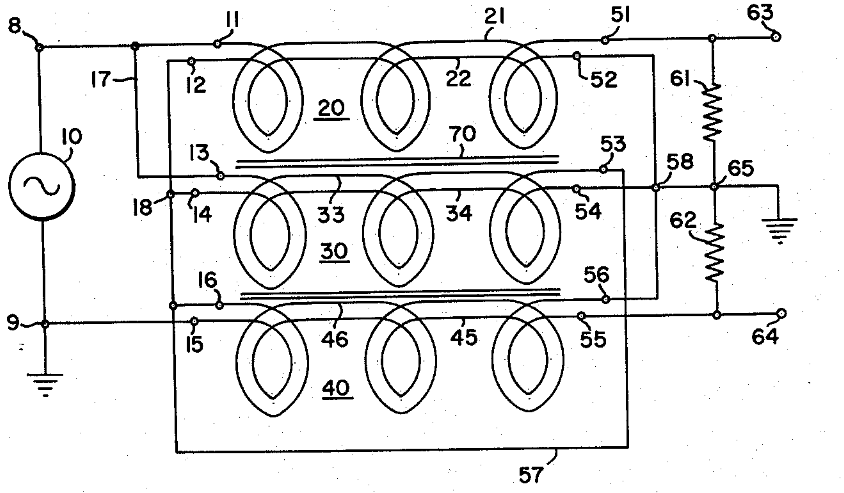

This invention relates to a radio frequency transmission network and more particularly to a network for transferring radio frequency energy from a single-ended or unsymmetrical circuit to a double-ended or symmetrical circuit.

An object of the invention is to provide a radio transmission system which will transmit radio frequencies between a single ended circuit having two terminals with one terminal grounded, and a double ended circuit having three terminals with one terminal grounded.

Another object of the invention is to provide a radio frequency transmission network which will transmit radio frequencies between a two terminal and a three terminal network with maximum efficiency.

Still another object of the invention is the provision of the radio frequency transmission network for transmitting energy between a single ended circuit and a double ended circuit at an impedance level higher than is usually used in transmission lines, yet with an efficiency equal to that associated with transmission lines.

Still another object of the invention is to provide a network which will transmit radio frequency signals between a single ended circuit and a double ended circuit, and divide this signal across the two load impedances of the double ended circuit equally.

A still further object of the invention is the provision of a radio frequency transmission line system which will transmit a signal between a single ended circuit and a double ended circuit so that the impedance between these two circuits can be matched over a wide range of frequencies at a relatively high power level.

Other objects of this invention will become apparent in the following description when taken in conjunction with the accompanying drawing. In the drawing, for illustrative purposes only, is shown a preferred embodiment of the invention.

Figure 2:
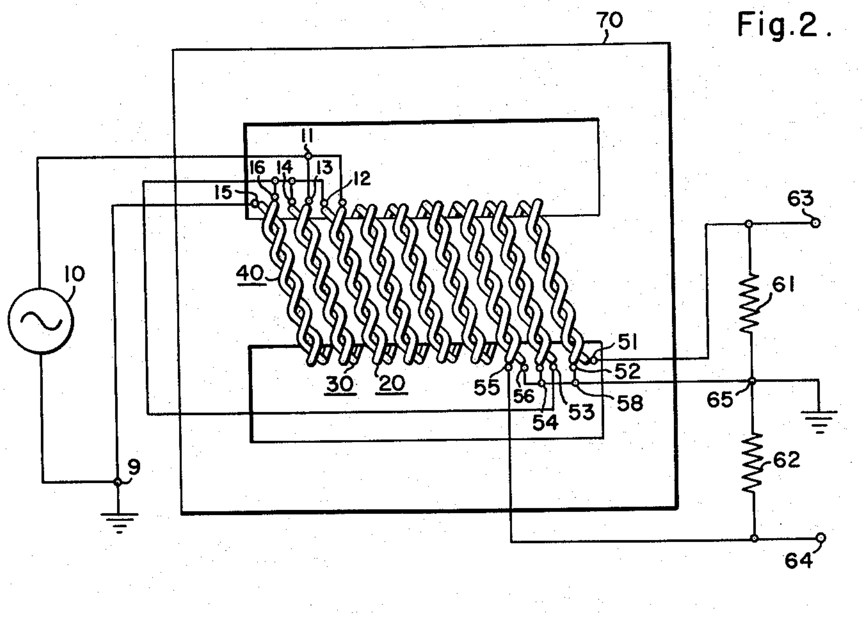

FIGURE 1 is a schematic diagram of a radio frequency transmitting network employing an embodiment of the invention; and FIG. 2 shows the spirally wound transmission lines and associated core shown in the schematic diagram of FIGURE 1.

The embodiment of the invention, shown in FIG. 1, consists generally of a network which transmits radio frequency energy between a single ended circuit through first and second input terminals, 8 and 9, to a double ended output having first, second and third output terminals 63, 64 and 65, respectively. The second input terminal 9 and the third output terminal 65 are grounded. The signal is passed between the input terminals 8 and 9 to the output terminals 63, 64 and 65 by first and second transmission lines 20 and 40. These transmission lines divide the signal across the two halves of the load, represented in the figure by a typical load composed of 61 and 62. When the terminals 65 and 9 are both grounded an added load consisting of the effective inductance of the length of the transmission lines is connected across the half of the load represented by 62 while no corresponding load is placed across 61. If the load to be fed is low impedance the effective unbalance is small and the effect of the inductance across half the load is tolerable.

An object of this invention is to provide a coupling between two circuits of relatively high impedance. The use of two transmission lines effectively connected in series at the input and output ends gives a line impedance higher than can be derived from a single transmission line. In the present invention a balancing means is employed comprising a third transmission line 30 which serves two purposes. This line is connected through lead 57 so the signal is carried through the two halves of the line in the effect of a center-tapped inductance. This center tap is connected to the input terminals 12 and 16 in a way which aids in dividing the voltage across the two transmission lines.

Another important effect of this connection of the third transmission line is to provide inductive coupling which will establish a voltage from end to end of each of the first two transmission lines. An effect of unbalance was described earlier which was caused by the connection of an added inductance across the half of the load represented by 62.

The inductive coupling tends to establish a voltage equal to that across the load 62 and therefore compensates for the unbalance effect which would be present without the inductive coupling afforded by the third line.

More specifically as illustrated in FIGURE 1 the present embodiment of the invention comprises first and second input terminals 8 and 9 which are adapted to receive a radio frequency signal emanating from a signal source 10. Being a single ended circuit the second input terminal 9 is grounded so as to be directly connected to the third output terminal 65 of the double ended output circuit which is also grounded. The double ended output circuit includes a first output terminal 63 and a second output terminal 64. Loads 61 and 62 are connected between terminals 63 and 65, and 65 and 64. Two twisted pair transmission lines are employed between the single ended circuit and a double ended circuit. These transmission lines are identified in the drawing as 20 and 40 and are of the conventional twisted pair type.

The first twisted pair transmission line 20 has, as shown in FIG. 1, input line terminals 11 and 12 with the input line terminal 11 being directly connected to the first input terminal 8. Terminals 11 and 12 mark the beginning of the first twisted pair conductors 21 and 22, respectively. The output of this twisted pair is defined by terminals 51 and 52 which are connected to the first output terminal 63 and the third output terminal 65, respectively.

The second transmission line 40 is similarly connected between the second input terminal 9 and the second load 62. The second transmission line 40 is a twisted pair transmission line having input line terminals 15 and 16 and output line terminals 55 and 56. Input line terminal 15 and output line terminal 55 are connected by a second conductor 45, whereas input line terminal 16 and output line terminal 56 are connected by another second conductor 46. The output terminals 56 and 55 are connected across the second load 62 with terminal 55 connected to terminal 64 and terminal 56 connected to third output terminal 65 through a common output center tap terminal 58. Additionally the first other conductor 22 and the second other conductor 46 are connected to a common input center tap 18 through terminals 12 and 16 respectively. By employing twisted pairs relatively high powers can be handled. To obviate the use of an extremely long transmission line, an iron core 70 is employed. Core 70 is made of a ferro magnetic ferrite material such as described in "Materials in Design Engineering" September, 1958 pages 96–101 and more specifically the Q type as identified on page 99. As shown in FIG. 2 the twisted pair transmission lines 20 and 40 are wound together about the core 70. A third twisted pair transmission line 30 is also wound about core 70 with the transmission lines 20 and 40. These three transmission lines are closely wound so as to allow inductive coupling.

The ferromic core 70 is employed to increase the end to end reactance of the line. This makes possible a reasonable inductance with a line which is short compared to the wavelengths of the signal. If this length is held less than ½ wavelength, the indicated source and load polarity can be achieved. The source or input impedance will be a function of the line characteristic and line length.

Twisted lines can be constructed with relatively high impedances compared to, for example, coaxial lines. In the above construction, however, it is seen that when two transmission lines are employed to match the output impedances, the second conductor 45 is placed across the second output impedance 62. This is due to the grounding of the second input terminal 9 and the third output terminal 65. Hence it is seen that due to this there will be a loss to the core through conductor 45 so as to unbalance the output.

In the present invention the above-mentioned unbalance is neutralized by the use of a third twisted pair transmission line 30. The third transmission line 30 has a third conductor 33 and another third conductor 34. The third conductor 33 is connected to the first input terminal 8 through terminal 13 and a conductor 17. The third other conductor 34 is connected to the input center tap 18 through terminal 14. An output line terminal 53 of conductor 33 is connected to the input center tap 18 by a conductor 57. The output line terminal 54 of conductor 34 is connected to center tap 58. The third transmission line 30 is of the twisted pair type and is wound about core 70 adjacent to the first and second transmission lines 20 and 30 as shown in FIGURE 2. By this construction the third transmission line 30 will supply the losses to the core 70 which result from a second conductor 45 being placed across the second load impedance 62. For purposes of illustration in FIGURE 2, only several turns around the core 70 are shown. Twisted pair transmission lines such as 20, 30, 40 will ordinarily not induce voltages due to the characteristic cancellation. In the present case, however, an unbalance will tend to occur in one of the pair of the second transmission line 40. However, due to the adjacent positioning of the third transmission line 30, these possible losses by the conductor 45, to the core 70, will be provided by transmission line 30 and balance obtained.

In testing the disclosed circuit, complete balance was obtained for center tapped loads from 200 to 900 ohms impedance with frequencies between 4 and 26.5 megacycles. 400 ohm twisted pair transmission lines were employed for transmission lines 20, 30 and 40.

Whereas the invention has been shown and described with respect to an embodiment thereof, it should be understood that changes may be made and elements substituted without departing from the spirit and scope of the invention.

I claim:

1. A radio frequency transmission means for applying a signal to a first and second load impedance comprising first and second input terminals, one terminal of said first and second load impedance connected to a point of reference potential, said second input terminal connected to said point of reference potential, transmission means for applying the signal across said first and second input terminals to said first and second load impedances comprising a first transmission line having a pair of first conductors with one first conductor connected to said first input terminal at one end and the other end of said first conductor and one end of the other first conductor connected to opposite ends of said first load impedance at the other end, a second transmission line having a pair of second conductors with one second conductor connected to said second input terminal at one end, the other end of said second conductor and one end of other second conductor thereof connected across said second load impedance, a balancing means comprising a third transmission line having a pair of third conductors with one third conductor connected at one end to said first input terminal, one end of the other third conductor connected to the other ends of said other first and second conductors, the other end of said third conductor connected to said one end of said other third conductor, said other end of said other third conductor connected to said point of reference potential, and said balancing means being positioned adjacent said first and second transmission line.

2. A network for transferring radio frequency energy from a single ended circuit to a double ended circuit comprising: a first and second input terminal; a first, second, and third output terminal, said second input terminal and said third output terminal being connected to a point of reference potential; a first pair and a second pair twisted transmission lines each pair having one conductor electrically connected between said first input and said first output terminal and connected between said second input and said second output terminal respectively, and each having the other conductor electrically connected together at a first and second common connection, said first common connection being returned to said point of reference potential; a third twisted pair transmission line forming a balancing circuit having its pair of conductors connected in series relationship across said first input terminal and said third output terminal, and the common connection between said last mentioned pair of conductors electrically connected to said second common connection of said first and second transmission line.

3. A network for transferring radio frequency energy from an unsymmetrical circuit to a symmetrical circuit comprising: first and second input terminals and first and second output terminals, a first pair of conductors serially connected between said first and second input terminals, said second input terminal being connected to a point of reference potential; two other pairs of conductors, one conductor of each of said two other pairs connected between said first input and said first output terminals and between said second input and said second output terminals respectively, the other conductor of each of said two other pairs parallelly connected between the common connection of said first pair of conductors and said point of reference potential.

4. A network for transferring radio frequency energy from a single ended circuit to a double ended circuit comprising: three pairs of electrical conductors including means for disposition on a magnetic core, said three pairs of conductors being inductively coupled to one another; a first and second input terminal; a first, second and a common output terminal, said second input terminal and said common output terminal being returned to a point of common reference potential; a first conductor of two of said three pairs of conductors electrically connected between said first input and said first output terminals and connected between said second input and said second output terminals respectively, a second conductor of said two pairs of conductors being connected together in parallel relationship having one common connection returned to said common reference potential; and the third pair of conductors serially connected between said first input terminal and said point of common reference potential, the common connection of said third pair of conductors being connected to the other common connection of the parallel connection of said second conductor of said two pairs of conductors.

5. A network for transferring radio frequency energy from a single ended circuit to a double ended circuit comprising: a first and second input terminal; a first and second output terminal, one of said input terminals being connected to a point of reference potential; a core; a first, second, and third twisted pair transmission line inductively disposed to each other on said core, a first conductor of said first and second twisted pair electrically connected between said first input and first output terminal and between said second input and second output terminal respectively, a second conductor of said first and second twisted pair being connected in parallel circuit relationship having one common connection connected to said point of reference potential; said third twisted pair transmission line having both conductors connected in series circuit relationship from said first input terminal to said point of reference potential, the common connection of said third twisted pair being connected to the opposite common connection of said second conductor of said first and second twisted pairs.

6. A radio frequency voltage balancing device comprising: input means including a first and second input terminal; output means including a first, second and a common output terminal; a first twisted pair transmission line having both conductors serially connected between said first and second input terminals, said second input terminal having means for connection to said common output terminal, said common output terminal being returned to a point of reference potential; a second and third twisted pair transmission line, one conductor of each of said second and third twisted pair connected between said first input and said first output terminal and between said second input and said second output terminal respectively, the other conductor of each of said second and third twisted pair parallelly connected between the common connection of said first twisted pair and said common output terminal; and a core of magnetic material, said first, second, and third twisted pair being inductively coupled to one another on said core.

7. A radio frequency transmission means for applying a signal to a first and second load impedance comprising: input means including a first and second input terminal; output means including a first, a second and a common output terminal; a magnetic core; a first twisted pair of conductors serially connected between said first and second input terminals and wound on said magnetic core; two other twisted pairs of conductors wound on said core, one conductor of each of said two other twisted pairs connected between said first input and said first output terminals and between said second input and said second output terminals respectively, the other conductor of each of said two other twisted pairs parallelly connected to the common connection of said first twisted pair of conductors, the opposite end thereof being connected to the common output terminal.

References Cited in the file of this patent

UNITED STATES PATENTS

| | | |
|---|---|---|
| 2,727,149 | Sands | Dec. 13, 1955 |
| 2,934,721 | De Long | Apr. 26, 1960 |